(12) United States Patent
Morrow et al.

(10) Patent No.: US 8,337,352 B2
(45) Date of Patent: Dec. 25, 2012

(54) ELECTROMECHANICAL VARIABLE TRANSMISSION

(75) Inventors: Jon Morrow, Neenah, WI (US); Dave Steinberger, Oshkosh, WI (US); Eric Braun, Oshkosh, WI (US); Andrew Kotloski, Oshkosh, WI (US); Nader Nasr, Neenah, WI (US)

(73) Assignee: Oshkosh Corporation, Oshkosh, WI (US)

( * ) Notice: Subject to any disclaimer, the term of this patent is extended or adjusted under 35 U.S.C. 154(b) by 108 days.

(21) Appl. No.: 12/820,928

(22) Filed: Jun. 22, 2010

(65) Prior Publication Data

US 2011/0312459 A1 Dec. 22, 2011

(51) Int. Cl.
*F16H 3/72* (2006.01)
(52) U.S. Cl. .............................. 475/5; 475/302
(58) Field of Classification Search .............. 475/5, 302; 903/910, 911; 180/65.7, 65.22, 65.235, 65.24
See application file for complete search history.

(56) References Cited

U.S. PATENT DOCUMENTS

| | | |
|---|---|---|
| 1,951,089 A | 3/1934 | Fielder |
| 3,524,069 A | 8/1970 | Stepanov et al. |
| 3,690,559 A | 9/1972 | Rudloff |
| 3,764,867 A | 10/1973 | Smith |
| 3,799,284 A | 3/1974 | Hender |
| 3,865,209 A | 2/1975 | Aihara et al. |
| 3,966,067 A | 6/1976 | Reese |
| 4,021,704 A | 5/1977 | Norbeck |
| 4,088,934 A | 5/1978 | D'Atre et al. |
| 4,097,925 A | 6/1978 | Butler, Jr. |
| 4,113,045 A | 9/1978 | Downing, Jr. |
| 4,196,785 A | 4/1980 | Downing, Jr. |
| 4,292,531 A | 9/1981 | Williamson |
| 4,319,140 A | 3/1982 | Paschke |
| 4,336,418 A | 6/1982 | Hoag |
| 4,347,907 A | 9/1982 | Downing, Jr. |

(Continued)

FOREIGN PATENT DOCUMENTS

CN 101323243 A 12/2008

(Continued)

OTHER PUBLICATIONS

Invitation to Pay Additional Fees regarding International Application No. PCT/US2011/041089, mail date Sep. 6, 2011, 5 pages.

(Continued)

*Primary Examiner* — Sherry Estremsky
*Assistant Examiner* — Lillian Nguyen
(74) *Attorney, Agent, or Firm* — Foley & Lardner LLP

(57) ABSTRACT

A vehicle drive includes a first gear set and a second gear set both having a sun gear, a ring gear and planetary gears which couple the sun gear to the ring gear. The planetary gears of both sets are rotatably supported by respective planetary gear carriers which are coupled to each other. The vehicle drive also includes an engine, a first clutch which selectively engages the engine to the ring gear of the first gear set, a first motor/generator coupled to the sun gear of the first gear set and a second motor/generator coupled to the sun gear of the second gear set and electrically coupled to the first motor/generator, a second clutch which selectively engages the engine to the second motor/generator, and a third clutch and a third gear set which operate to selectively engage the ring gear of the second gear set to the planetary gear carriers.

12 Claims, 3 Drawing Sheets

U.S. PATENT DOCUMENTS

| | | | |
|---|---|---|---|
| 4,411,171 A | 10/1983 | Fiala | |
| 4,423,362 A | 12/1983 | Konrad et al. | |
| 4,423,794 A | 1/1984 | Beck | |
| 4,444,285 A | 4/1984 | Stewart et al. | |
| 4,461,988 A | 7/1984 | Plunkett | |
| 4,533,011 A | 8/1985 | Heidemeyer et al. | |
| 4,562,894 A | 1/1986 | Yang | |
| 4,719,361 A | 1/1988 | Brubaker | |
| 4,760,275 A | 7/1988 | Sato et al. | |
| 4,774,399 A | 9/1988 | Fujita et al. | |
| 4,774,811 A | 10/1988 | Kawamura | |
| 4,809,177 A | 2/1989 | Windle et al. | |
| 4,953,646 A | 9/1990 | Kim | |
| 4,966,242 A | 10/1990 | Baillargeon | |
| 4,985,845 A | 1/1991 | Götz et al. | |
| 5,067,932 A | 11/1991 | Edwards | |
| 5,081,832 A | 1/1992 | Mowill | |
| 5,120,282 A | 6/1992 | Fjallstrom | |
| 5,168,946 A | 12/1992 | Dorgan | |
| 5,180,456 A | 1/1993 | Schultz et al. | |
| 5,195,600 A | 3/1993 | Dorgan | |
| 5,201,629 A | 4/1993 | Simpson et al. | |
| 5,227,703 A | 7/1993 | Boothe et al. | |
| 5,263,524 A | 11/1993 | Boardman | |
| 5,264,763 A | 11/1993 | Avitan | |
| 5,289,093 A | 2/1994 | Jobard | |
| 5,291,960 A | 3/1994 | Brandenburg et al. | |
| 5,343,971 A | 9/1994 | Heidelberg et al. | |
| 5,345,154 A | 9/1994 | King | |
| 5,369,540 A | 11/1994 | Konrad et al. | |
| 5,389,825 A | 2/1995 | Ishikawa et al. | |
| 5,409,425 A | 4/1995 | Shibahata | |
| 5,418,437 A | 5/1995 | Couture et al. | |
| 5,448,561 A | 9/1995 | Kaiser et al. | |
| 5,504,655 A | 4/1996 | Underwood et al. | |
| 5,508,594 A | 4/1996 | Underwood et al. | |
| 5,508,689 A | 4/1996 | Rado et al. | |
| 5,516,379 A | 5/1996 | Schultz | |
| 5,538,274 A | 7/1996 | Schmitz et al. | |
| 5,558,588 A | 9/1996 | Schmidt | |
| 5,558,589 A | 9/1996 | Schmidt | |
| 5,558,595 A | 9/1996 | Schmidt et al. | |
| 5,568,023 A | 10/1996 | Grayer et al. | |
| 5,575,730 A | 11/1996 | Edwards et al. | |
| 5,575,737 A | 11/1996 | Weiss | |
| 5,586,613 A | 12/1996 | Ehsani | |
| 5,589,743 A | 12/1996 | King | |
| 5,629,567 A | 5/1997 | Kumar | |
| 5,629,603 A | 5/1997 | Kinoshita | |
| 5,646,510 A | 7/1997 | Kumar | |
| 5,669,470 A | 9/1997 | Ross | |
| 5,669,842 A | 9/1997 | Schmidt | |
| 5,672,920 A | 9/1997 | Donegan et al. | |
| 5,679,085 A | 10/1997 | Fredriksen et al. | |
| 5,722,502 A | 3/1998 | Kubo | |
| 5,767,584 A | 6/1998 | Gore et al. | |
| 5,786,640 A | 7/1998 | Sakai et al. | |
| 5,789,882 A | 8/1998 | Ibaraki et al. | |
| 5,813,487 A | 9/1998 | Lee et al. | |
| 5,813,488 A | 9/1998 | Weiss | |
| 5,820,150 A | 10/1998 | Archer et al. | |
| 5,828,554 A | 10/1998 | Donegan et al. | |
| 5,847,520 A | 12/1998 | Theurillat et al. | |
| 5,879,265 A | 3/1999 | Bek | |
| 5,880,570 A | 3/1999 | Tamaki et al. | |
| 5,881,559 A | 3/1999 | Kawamura | |
| 5,895,333 A | 4/1999 | Morisawa et al. | |
| 5,924,879 A | 7/1999 | Kameyama | |
| 5,925,993 A | 7/1999 | Lansberry | |
| 5,927,417 A | 7/1999 | Brunner et al. | |
| 5,934,395 A | 8/1999 | Koide et al. | |
| 5,939,794 A | 8/1999 | Sakai et al. | |
| 5,947,855 A | 9/1999 | Weiss | |
| 5,957,985 A | 9/1999 | Wong et al. | |
| 5,973,463 A | 10/1999 | Okuda et al. | |
| 5,980,410 A | 11/1999 | Stemler et al. | |
| 5,986,416 A | 11/1999 | Dubois | |
| 5,998,880 A | 12/1999 | Kumar | |
| 6,005,358 A | 12/1999 | Radev | |
| 6,012,004 A | 1/2000 | Sugano et al. | |
| 6,028,403 A | 2/2000 | Fukatsu | |
| 6,038,500 A | 3/2000 | Weiss | |
| 6,054,844 A | 4/2000 | Frank | |
| 6,104,148 A | 8/2000 | Kumar et al. | |
| 6,105,984 A | 8/2000 | Schmitz et al. | |
| 6,201,310 B1 | 3/2001 | Adachi et al. | |
| 6,298,932 B1 | 10/2001 | Bowman et al. | |
| 6,356,817 B1 | 3/2002 | Abe | |
| 6,371,878 B1 | 4/2002 | Bowen | |
| 6,387,007 B1 | 5/2002 | Fini, Jr. | |
| 6,404,607 B1 | 6/2002 | Burgess et al. | |
| 6,421,593 B1 | 7/2002 | Kempen et al. | |
| 6,434,470 B1 | 8/2002 | Nantz et al. | |
| 6,478,705 B1 | 11/2002 | Holmes et al. | |
| 6,496,393 B1 | 12/2002 | Patwardhan | |
| 6,501,368 B1 | 12/2002 | Wiebe et al. | |
| 6,553,287 B1 | 4/2003 | Supina et al. | |
| 6,553,290 B1 | 4/2003 | Pillar | |
| 6,575,866 B2 | 6/2003 | Bowen | |
| 6,580,953 B1 | 6/2003 | Wiebe et al. | |
| 6,607,466 B2 | 8/2003 | Bordini | |
| 6,611,116 B2 | 8/2003 | Bachman et al. | |
| 6,702,709 B2 | 3/2004 | Bowen | |
| 6,722,458 B2 | 4/2004 | Hofbauer | |
| 6,726,592 B2 | 4/2004 | Kotani | |
| 6,757,597 B2 | 6/2004 | Yakes et al. | |
| 6,793,600 B2 | 9/2004 | Hiraiwa | |
| 6,819,985 B2 | 11/2004 | Minagawa et al. | |
| 6,846,257 B2 | 1/2005 | Baker et al. | |
| 6,852,053 B2 | 2/2005 | Nakano et al. | |
| 6,852,054 B2 | 2/2005 | Tumback et al. | |
| 6,882,917 B2 | 4/2005 | Pillar et al. | |
| 6,885,920 B2 | 4/2005 | Yakes et al. | |
| 6,886,647 B1 | 5/2005 | Gotta | |
| 6,909,944 B2 | 6/2005 | Pillar et al. | |
| 6,922,615 B2 | 7/2005 | Pillar et al. | |
| 6,953,409 B2 * | 10/2005 | Schmidt et al. | 475/5 |
| 6,991,054 B2 | 1/2006 | Takaoka et al. | |
| 6,993,421 B2 | 1/2006 | Pillar et al. | |
| 6,994,646 B2 | 2/2006 | Ai | |
| 7,000,717 B2 | 2/2006 | Ai et al. | |
| 7,004,868 B2 | 2/2006 | Oshidari et al. | |
| 7,006,902 B2 | 2/2006 | Archer et al. | |
| 7,024,296 B2 | 4/2006 | Squires et al. | |
| 7,053,566 B2 | 5/2006 | Aizawa et al. | |
| 7,076,356 B2 | 7/2006 | Hubbard et al. | |
| 7,154,236 B1 * | 12/2006 | Heap | 318/9 |
| 7,179,187 B2 | 2/2007 | Raghavan et al. | |
| 7,196,430 B2 | 3/2007 | Yang | |
| 7,204,776 B2 | 4/2007 | Minagawa et al. | |
| 7,217,211 B2 | 5/2007 | Klemen et al. | |
| 7,219,756 B2 | 5/2007 | Bischoff | |
| 7,223,200 B2 | 5/2007 | Kojima et al. | |
| 7,246,672 B2 | 7/2007 | Shirai et al. | |
| 7,276,007 B2 | 10/2007 | Takami et al. | |
| 7,282,003 B2 * | 10/2007 | Klemen et al. | 475/5 |
| 7,322,896 B2 | 1/2008 | Minagawa | |
| 7,338,401 B2 | 3/2008 | Klemen et al. | |
| 7,363,996 B2 * | 4/2008 | Kamada et al. | 180/65.21 |
| 7,367,415 B2 | 5/2008 | Oliver et al. | |
| 7,467,678 B2 | 12/2008 | Tanaka et al. | |
| 7,479,080 B2 | 1/2009 | Usoro | |
| 7,520,354 B2 | 4/2009 | Morrow et al. | |
| 7,527,573 B2 | 5/2009 | Lang et al. | |
| 7,572,201 B2 | 8/2009 | Supina et al. | |
| 7,597,164 B2 | 10/2009 | Severinsky et al. | |
| 7,601,093 B2 | 10/2009 | Tabata et al. | |
| 7,635,039 B2 | 12/2009 | Fujiwara et al. | |
| 7,678,014 B2 | 3/2010 | Nohara et al. | |
| 7,749,131 B2 | 7/2010 | Imamura et al. | |
| 7,811,191 B2 | 10/2010 | Iwase et al. | |
| 7,888,894 B2 | 2/2011 | Sugawara et al. | |
| 7,908,063 B2 | 3/2011 | Sah | |
| 7,927,250 B2 | 4/2011 | Imamura et al. | |
| 7,935,021 B2 | 5/2011 | Tabata et al. | |
| 7,935,022 B2 | 5/2011 | Iwase et al. | |
| 7,941,259 B2 | 5/2011 | Tabata et al. | |

| | | | |
|---|---|---|---|
| 7,972,237 B2 | 7/2011 | Ota | |
| 8,007,402 B2 | 8/2011 | Tabata et al. | |
| 8,038,572 B2 | 10/2011 | Matsubara et al. | |
| 8,062,172 B2 | 11/2011 | Supina et al. | |
| 8,091,662 B2 | 1/2012 | Tolksdorf | |
| 2002/0005304 A1 | 1/2002 | Bachman et al. | |
| 2002/0045507 A1 | 4/2002 | Bowen | |
| 2002/0065594 A1 | 5/2002 | Squires et al. | |
| 2003/0130765 A1 | 7/2003 | Pillar et al. | |
| 2003/0158635 A1 | 8/2003 | Pillar et al. | |
| 2003/0163228 A1 | 8/2003 | Pillar et al. | |
| 2003/0163230 A1 | 8/2003 | Pillar et al. | |
| 2003/0171854 A1 | 9/2003 | Pillar et al. | |
| 2003/0195680 A1 | 10/2003 | Pillar | |
| 2003/0200015 A1 | 10/2003 | Pillar | |
| 2003/0230443 A1 | 12/2003 | Cramer et al. | |
| 2004/0019414 A1 | 1/2004 | Pillar et al. | |
| 2004/0024502 A1 | 2/2004 | Squires et al. | |
| 2004/0039510 A1 | 2/2004 | Archer et al. | |
| 2004/0055802 A1 | 3/2004 | Pillar et al. | |
| 2004/0069865 A1 | 4/2004 | Rowe et al. | |
| 2004/0133319 A1 | 7/2004 | Pillar et al. | |
| 2004/0133332 A1 | 7/2004 | Yakes et al. | |
| 2004/0199302 A1 | 10/2004 | Pillar et al. | |
| 2004/0251862 A1* | 12/2004 | Imai | 318/376 |
| 2005/0004733 A1 | 1/2005 | Pillar et al. | |
| 2005/0038934 A1 | 2/2005 | Gotze et al. | |
| 2005/0113988 A1 | 5/2005 | Nasr et al. | |
| 2005/0113996 A1 | 5/2005 | Pillar et al. | |
| 2005/0114007 A1 | 5/2005 | Pillar et al. | |
| 2005/0119806 A1 | 6/2005 | Nasr et al. | |
| 2005/0131600 A1 | 6/2005 | Quigley et al. | |
| 2005/0137042 A1 | 6/2005 | Schmidt et al. | |
| 2005/0209747 A1 | 9/2005 | Yakes et al. | |
| 2005/0234622 A1 | 10/2005 | Pillar et al. | |
| 2005/0252703 A1* | 11/2005 | Schmidt et al. | 180/65.2 |
| 2006/0289212 A1* | 12/2006 | Haruhisa | 180/65.2 |
| 2007/0105678 A1 | 5/2007 | Bucknor et al. | |
| 2007/0254761 A1* | 11/2007 | Kim | 475/5 |
| 2008/0200296 A1 | 8/2008 | Holmes | |
| 2008/0234087 A1 | 9/2008 | Besnard et al. | |
| 2008/0269000 A1* | 10/2008 | Abe et al. | 475/205 |
| 2009/0209381 A1 | 8/2009 | Ai et al. | |
| 2009/0221390 A1 | 9/2009 | Houle | |
| 2009/0227409 A1 | 9/2009 | Ito et al. | |
| 2009/0227417 A1 | 9/2009 | Imamura et al. | |
| 2010/0051361 A1 | 3/2010 | Katsuta et al. | |
| 2010/0051367 A1 | 3/2010 | Yamada et al. | |
| 2010/0120579 A1 | 5/2010 | Kawasaki | |
| 2010/0121512 A1* | 5/2010 | Takahashi et al. | 701/22 |
| 2010/0138086 A1 | 6/2010 | Imamura et al. | |
| 2010/0145589 A1 | 6/2010 | Kobayashi | |
| 2010/0227722 A1 | 9/2010 | Conlon | |
| 2010/0261565 A1 | 10/2010 | Ai et al. | |
| 2010/0326752 A1 | 12/2010 | Lamperth | |
| 2011/0130234 A1 | 6/2011 | Phillips | |
| 2011/0143875 A1* | 6/2011 | Ono et al. | 475/5 |
| 2012/0022737 A1 | 1/2012 | Kumazaki et al. | |

FOREIGN PATENT DOCUMENTS

| | | |
|---|---|---|
| DE | 18 16 183 | 6/1970 |
| DE | 41 08 647 A1 | 9/1992 |
| DE | 41 34 160 A1 | 4/1993 |
| DE | 44 31 929 C1 | 10/1995 |
| DE | 197 49 074 A1 | 5/1999 |
| DE | 198 51 436 A1 | 5/2000 |
| EP | 0 791 506 A2 | 8/1997 |
| EP | 0 622 264 B1 | 11/1998 |
| EP | 0 898 213 A1 | 2/1999 |
| EP | 0 925 981 A2 | 6/1999 |
| EP | 0 805 059 B1 | 11/1999 |
| EP | 1 018 451 A1 | 7/2000 |
| EP | 1 092 406 A2 | 4/2001 |
| EP | 0 564 943 B1 | 6/2001 |
| EP | 1 142 744 A1 | 10/2001 |
| EP | 0 812 720 B1 | 12/2001 |
| EP | 1 229 636 A2 | 8/2002 |
| EP | 0 937 600 B1 | 12/2005 |
| FR | 2658259 A1 | 8/1991 |
| GB | 1 308 318 | 2/1973 |
| GB | 2 302 850 A | 2/1997 |
| JP | 60-216703 | 10/1985 |
| JP | 2010070008 A | 4/2010 |
| WO | WO 98/19875 A1 | 5/1998 |
| WO | WO 00/30235 A1 | 5/2000 |
| WO | WO 01/54939 A2 | 8/2001 |
| WO | WO 03/055714 A1 | 7/2003 |
| WO | WO 03/093046 A2 | 11/2003 |

OTHER PUBLICATIONS

Bose, et al., "High Frequency AC vs. DC Distribution System for Next Generation Hybrid Electric Vehicle," Industrial Electronics, Control and Instrumentation, Proceedings of the 1996 IEEE IECON 22nd International Conference on Taipei, Taiwan, New York, New York, pp. 706-712 Aug. 5-10, 1996.

Khan, I.A., Automotive Electrical Systems: Architecture and Components, Digital Avionics Systems Conference, IEEE, pp. 8.C.5-1-8.C.5-10, 1999.

Namuduri, et al., High Power Density Electric Drive for an Hybrid Vehicle, Applied Power Electronics Conference and Exposition, pp. 34-40, Feb. 15, 1998.

Rajashekara, K., History of Electric Vehicles in General Motors, Industry Applications Society Annual Meeting, pp. 447-454, Oct. 2-8, 1993.

Shigley et al., Theory of Machines and Mechanisms, complete text, McGraw-Hill Book Company, published in the United States, 297 pages, 1980.

The European Search Report based on European Application No. EP 0724300, date of completion of the search Jul. 4, 2005, 2 pages.

Dana Spicer Central Tire Inflation System Specifications, Dana Corporation, Kalamazoo, Michigan, 2 pages, May 2000.

Diesel Locomotive Technology, http://www.railway-technical.com/diesel.shtml, available by Jan. 24, 2012, 15 pages.

Miller, Hybrid Electric Vehicle Propulsion System Architectures of the e-CVT Type, IEEE Transactions on Power Electronics, vol. 21, No. 3, May 2006, 12 pages.

* cited by examiner

ELECTROMECHANICAL VARIABLE TRANSMISSION

STATEMENT REGARDING FEDERALLY-SPONSORED RESEARCH OR DEVELOPMENT

The government of the United States has certain rights in this invention pursuant to Contract No. N0014-09-C-0601 awarded by the Office of Naval Research.

BACKGROUND

The present disclosure relates generally to the field of transmissions for vehicles. More specifically, the present disclosure relates to the field of electromechanical infinitely variable transmissions for vehicles.

SUMMARY

One exemplary embodiment relates to a vehicle drive including a first gear set including a sun gear, a ring gear and planetary gears which couple the sun gear to the ring gear. The vehicle drive also includes a second gear set including a sun gear, a ring gear and planetary gears which couple the sun gear to the ring gear. The planetary gears of both sets are rotatably supported by respective planetary gear carriers which are coupled to each other. The vehicle drive further includes an engine and a first clutch which selectively engages the engine to the ring gear of the first gear set. The vehicle drive still further includes a first motor/generator coupled to the sun gear of the first gear set and a second motor/generator coupled to the sun gear of the second gear set and electrically coupled to the first motor/generator. The vehicle drive still further includes a second clutch which selectively engages the engine to the second motor/generator and a third clutch and a third gear set which operate to selectively engage the ring gear of the second gear set to the planetary gear carriers.

Another exemplary embodiment relates to a vehicle transmission including a first planetary gear set having planetary gears and a second planetary gear set having planetary gears directly coupled to the planetary gears of the first planetary gear set. The vehicle transmission also includes an engine rotationally coupled to the first planetary gear set. The vehicle transmission further includes a first electromagnetic device rotationally coupled to the first planetary gear set and a second electromagnetic device rotationally coupled to the second planetary gear set and selectively rotationally engaged with the engine.

Another exemplary embodiment relates to a vehicle having a drive train including a dual-mode transmission having a first gear set and a second gear set. The vehicle also includes an engine coupled to the first gear set. The vehicle further includes a first electromagnetic device coupled to the first gear set and a second electromagnetic device coupled to the second gear set. The vehicle still further includes at least one drive axle coupled to the transmission. During a first mode of operation of the vehicle the second electromagnetic device is selectively coupled to the drive axle via the second gear set and during a second mode of operation of the vehicle the second electromagnetic device is selectively coupled to the engine Another exemplary embodiment relates to a transmission for a vehicle including a first gear set having a first gear configured to be coupled to an engine, a second gear configured to be coupled to a first electromechanical device, and a third gear configured to be rotationally engaged to a drive axle of the vehicle. The transmission also includes a second gear set having a first gear configured to be coupled to a second electromechanical device, a second gear configured to be coupled to the third gear of the first gear set, and a third gear configured to be selectively rotationally engaged with the drive axle of the vehicle.

DETAILED DESCRIPTION

Figure 1:
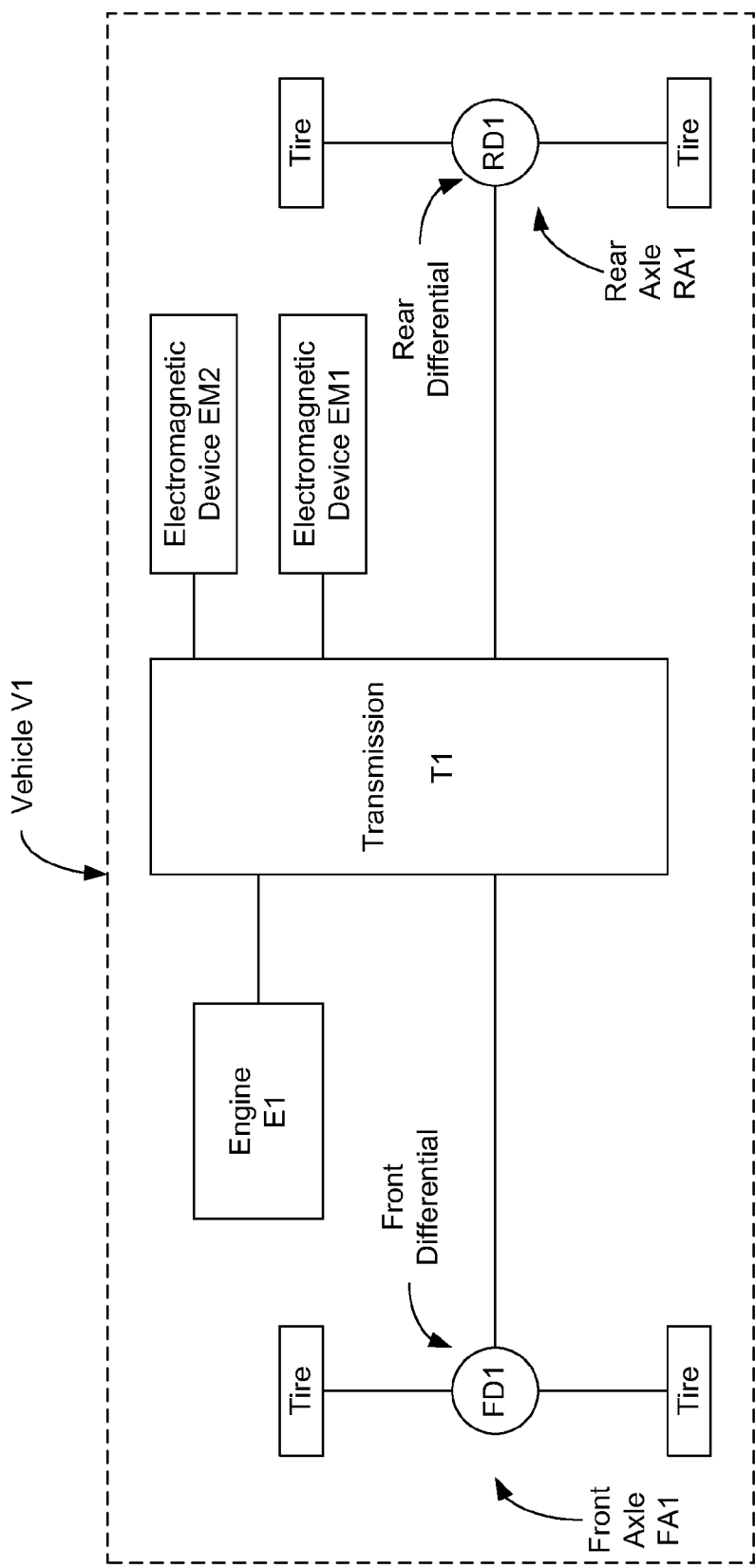
FIG. 1 is a schematic view of drive train for a vehicle according to an exemplary embodiment.

Referring to FIG. 1, a schematic view of a drive train for a vehicle V1 is shown according to an exemplary embodiment. The vehicle V1 may be a work or commercial vehicle, a military vehicle, or any other type of vehicle.

According to an exemplary embodiment, the drive train includes an engine E1 coupled to a transmission T1. The vehicle V1 also includes a first electromagnetic device EM1 coupled to the transmission T1 and a second electromagnetic device EM2 coupled to the transmission T1. The vehicle V1 also includes at least one drive axle (such as, e.g., rear axle RA1 and/or front axle FA1) coupled to the transmission T1.

According to an exemplary embodiment, the engine E1 is configured to provide rotational mechanical energy to the transmission T1. The engine E1 may be any source of rotational mechanical energy which is derived from a stored energy source such as a liquid or gaseous fuel. Examples are an internal combustion engine (such as a gas, natural gas, or diesel powered engine), turbine, fuel cell, electric motor or any other type of motor capable of providing rotational mechanical energy to the transmission T1. According to one exemplary embodiment, the engine E1 is a twelve liter diesel engine capable of providing approximately 400 to 600 horsepower, 400-1500 ft-lbs of torque, and has a rotational speed of approximately 0 to 2100 rpm. According to one exemplary embodiment, the engine E1 is operated at a relatively constant speed (such as, e.g., 1600 rpm) to maximize fuel efficiency.

According to an exemplary embodiment, the electromagnetic devices EM1, EM2 are electric motor/generator devices that are capable of providing rotational electrical energy (as an electric motor) and/or capable of producing electrical power (as a generator). According to one exemplary embodiment, the electromagnetic devices EM1, EM2 provide electric power to one another, depending on the specific mode of operation of the vehicle V1. For example, the first electromagnetic device EM1 may be operated as a generator to provide electric power to the second electromagnetic device EM2. Alternatively, the second electromagnetic device EM2 may be operated as a generator to provide electric power to the first electromagnetic device EM1.

According to one exemplary embodiment, the first electromagnetic device EM1 and the second electromagnetic device EM2 may be the same (or similar) to one another. However, according to other exemplary embodiments, the first electromagnetic device EM1 and the second electromagnetic device EM2 may be sized differently as required by a particular application. According to one exemplary embodiment, the electromagnetic devices EM1, EM2 are each capable of providing up to approximately 300 horsepower and 1300 ft-lbs of torque and are capable of rotational speeds from approximately −6,000 to 6,000 rpm (i.e., both forward and reverse from 0 to 6,000 rpm).

According to an exemplary embodiment, the transmission T1 is coupled to at least one drive axle of the vehicle V1 (such as, e.g., rear axle RA1 and/or front axle FA1 as shown in FIG. 1). According to one exemplary embodiment, both the rear axle RA1 and the front axle FA1 are driven by the transmission T1. According to other exemplary embodiments, only one of the axles may be driven by the transmission T1. According to yet another exemplary embodiment, additional axles (e.g., such as additional rear axles not shown) may be driven by the transmission T1. According to an exemplary embodiment, each of the axles are coupled to the transmission via a differential gear set (such as, e.g., rear differential RD1 and/or front differential FD1 shown in FIG. 1). Each axle is configured to drive (i.e., provide rotational energy to) one or more wheels/tires to propel (e.g., move, push, drive etc.) the vehicle V1.

Figure 2:
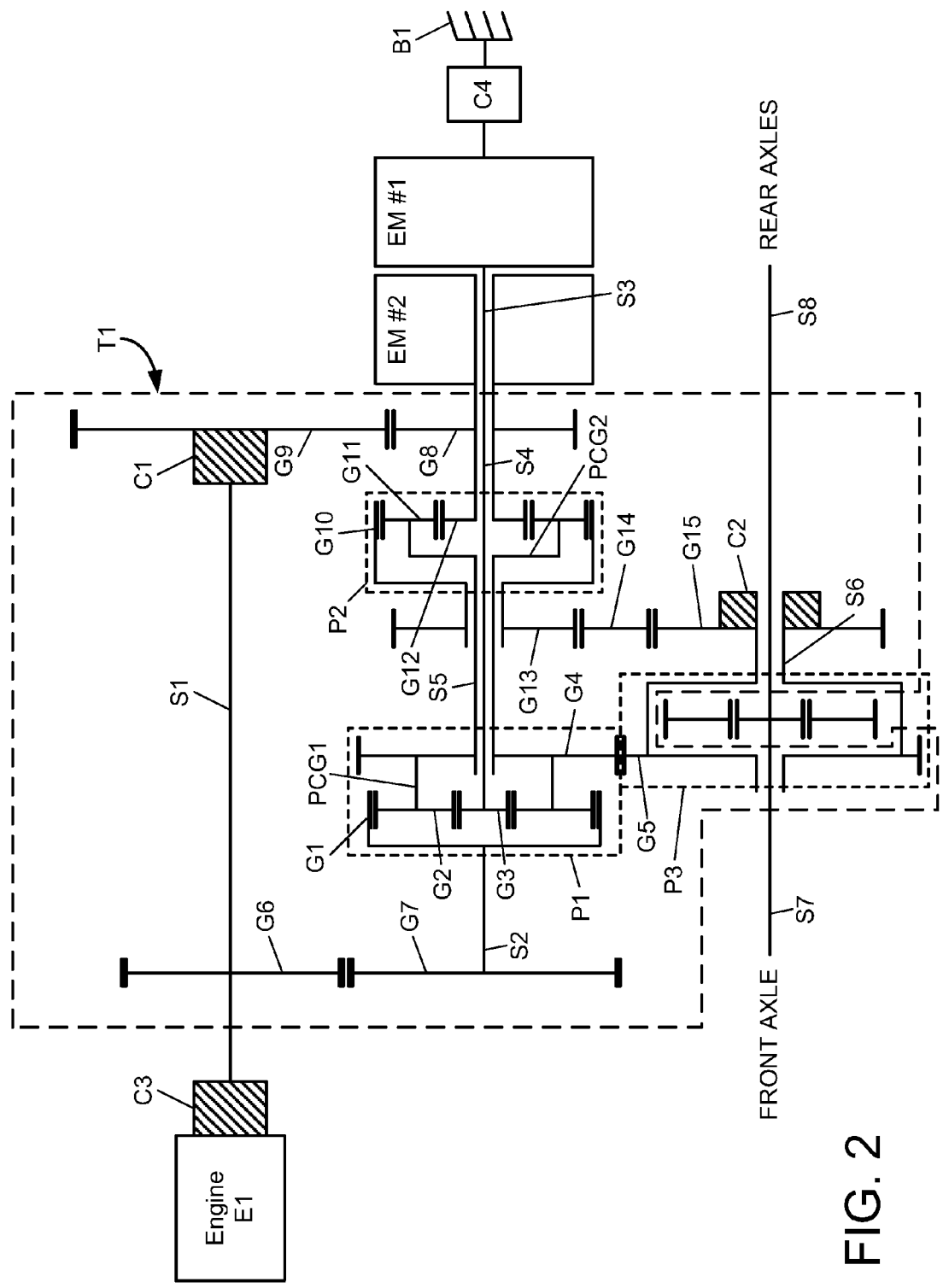
FIG. 2 is a detailed schematic view of the drive train shown in FIG. 1 according to an exemplary embodiment.

Referring now to FIG. 2, a detailed schematic view of the drive train for the vehicle V1 is shown according to exemplary embodiment. As shown in FIG. 2, the transmission T1 includes two planetary gear sets. According to an exemplary embodiment, the transmission T1 includes a first planetary gear set P1 and a second planetary gear set P2. A third planetary gear set P3 is provided as a torque divider (e.g., 30% torque to the front and 70% torque to the rear) if both the front and rear vehicle axles are powered.

According to one exemplary embodiment, the first planetary gear set P1 is configured as a power split device or power splitting planetary gear set, the second planetary gear set P2 is configured as a gear reduction device, and the third planetary gear set P3 is configured as a torque proportioning device. As shown in FIG. 2, the first planetary gear set P1 is coupled to the engine E1, the first electromechanical device EM1, the second electromechanical device EM2 (via the second planetary gear set P2), and to gear G5. The second planetary gear set P2 is also coupled to the gear G5 (via gears G13, G14, G15, clutch C2 and shaft S6).

As shown in FIG. 2, the engine E1 is coupled to a clutch C3 that is configured to selectively rotationally engage/disengage the engine E1 with the transmission T1. The clutch C3 may be any type of clutch capable of rotationally fixing the engine E1 to the transmission T1. When the clutch C3 is engaged, the engine E1 is coupled to a shaft S1. A gear G6 is coupled (e.g., rotationally fixed) to shaft S1 and engages a gear G7 that is coupled (e.g., rotationally fixed) to a shaft S2. The gear G7 in turn is coupled to the first planetary gear set P1 via the shaft S2.

As shown in FIG. 2, the first planetary gear set P1 comprises an annulus or ring gear G1 which is coupled to the shaft S2. As shown, the clutch C3, the gears G6 and G7, and the shaft S2 cooperate to permit engine E1 to drive the ring gear G1. The ring gear G1 is engaged with at least one planetary gear G2 (e.g., one, two, three, four or more planetary gears G2 that are coupled to one another (e.g., rotatably supported) by a planetary gear carrier PGC1). The planetary gear(s) G2 are engaged with a sun gear G3 of the first planetary gear set P1 to couple the ring gear G1 to the sun gear G3.

The sun gear G3 is directly coupled to the first electromagnetic device EM1 by a shaft S3. The first electromagnetic device EM1 may be coupled to an optional brake B1 by a clutch C4. The clutch C4 may be any type of clutch capable of rotationally fixing the first electromagnetic device EM1 to the brake B1. The effect of braking the first electromechanical device EM1 is to fix or hold sun gear G3 without the need to apply electrical energy to the first electromechanical device EM1 to cause the first electromechanical device EM1 to generate enough holding torque to hold the gear G3 from rotating.

According to an exemplary embodiment, the planetary gear carrier PGC1 is coupled to a carrier gear G4. The carrier gear G4 is engaged with a gear G5. In the preferred embodiment of vehicle V1, the gear G5 is part of the third planetary gear set P3 used to divide the power from the transmission T1 to the front and rear axles. In this embodiment, the gear G5 is coupled to the planetary gears of the third planetary gear set P3. If only a single axle is driven by the transmission T1, or a different transfer device is used to drive more than one axle, the third planetary gear set P3 may not be necessary.

The carrier gear G4 is also coupled to the second planetary gear set P2 by a shaft S5 (as will be described in more detail below).

Still referring to FIG. 2, the transmission T1 also includes a clutch C1 that selectively rotationally engages/disengages the engine E1 to the second electromagnetic device EM2. The clutch C1 may be any type of clutch capable of rotationally fixing the engine E1 to the second electromagnetic device EM2, such as a wet clutch.

As shown in FIG. 2, the clutch C1 is coupled to the engine E1 by the shaft S1. When the clutch C1 is engaged, the shaft S1 is coupled to a gear G9. The gear G9 in turn is engaged with a gear G8 that is coupled to the second electromagnetic device EM2. Thus, when the clutch C1 is engaged, the engine is coupled to the second electromagnetic device EM2 to allow the second electromagnetic device EM2 to be driven as a generator (e.g., to provide electrical power to the first electromagnetic device EM1).

The electromagnetic device EM2 is also coupled to the second planetary gear set P2 by a shaft S4. The shaft S4 is connected to a sun gear G12 of the second planetary gear set P2. The sun gear G12 is engaged with at least one planetary gear G11 (e.g., one, two, three, four or more planetary gears G11 that are coupled to one another (e.g., rotatably supported) by a planetary gear carrier PGC2). The planetary gear(s) G11 in turn are engaged with an annulus or ring gear G10 to couple the sun gear G12 to the ring gear G10.

According to an exemplary embodiment, the planet gear carrier PGC2 of the second planetary gear P2 is coupled to the carrier gear G4 (and the planet gear carrier PGC1) of the first planetary gear set P1 by a shaft S5. Thus, the planet gear carrier PGC1 and the planet gear carrier PGC2 are coupled to one another so that the second electromagnetic device EM2 is coupled to the first planetary gear set P1 via the second planetary gear set P2.

The second electromagnetic device EM2 is also coupled to the third planetary gear set P3 via the second planetary gear set P2. According to an exemplary embodiment, the ring gear G10 of the second planetary gear P2 is coupled to an output gear G13 that is engaged with an idler gear G14. The idler gear G14 in turn is engaged with a gear G15 that is selectively engaged/disengaged to the third planetary gear set P3 by a clutch C2 (via a shaft S6). The clutch C2 may be any type of clutch capable of rotationally fixing the gear G15 to the shaft S6, such as a wet clutch.

According to an exemplary embodiment, the third planetary gear set P3 is a torque proportioning device for the front and rear axles of the vehicle V1. Torque is delivered from the third planetary gear set P3 to the front axle FA1 and/or the rear axle RA1 via shafts S7 and S8. As discussed above, in other exemplary embodiments, the third planetary gear set P3 is not necessary when either the front axle FA1 or rear axle RA1 of the vehicle V1 is not driven by the transmission T1.

According to an exemplary embodiment, the transmission T1 is operated in a low speed mode (e.g., a vehicle speed of approximately 0-10 mph) by having the clutch C2 engaged and the clutch C1 disengaged. According to another exemplary embodiment, the transmission T1 is operated in a high speed mode (e.g., a vehicle speed of approximately 10-65 mph) by having the clutch C1 engaged and the clutch C2 disengaged. According to other various embodiments, the vehicle speeds in the low and high speed modes may vary higher or lower.

Figure 3:
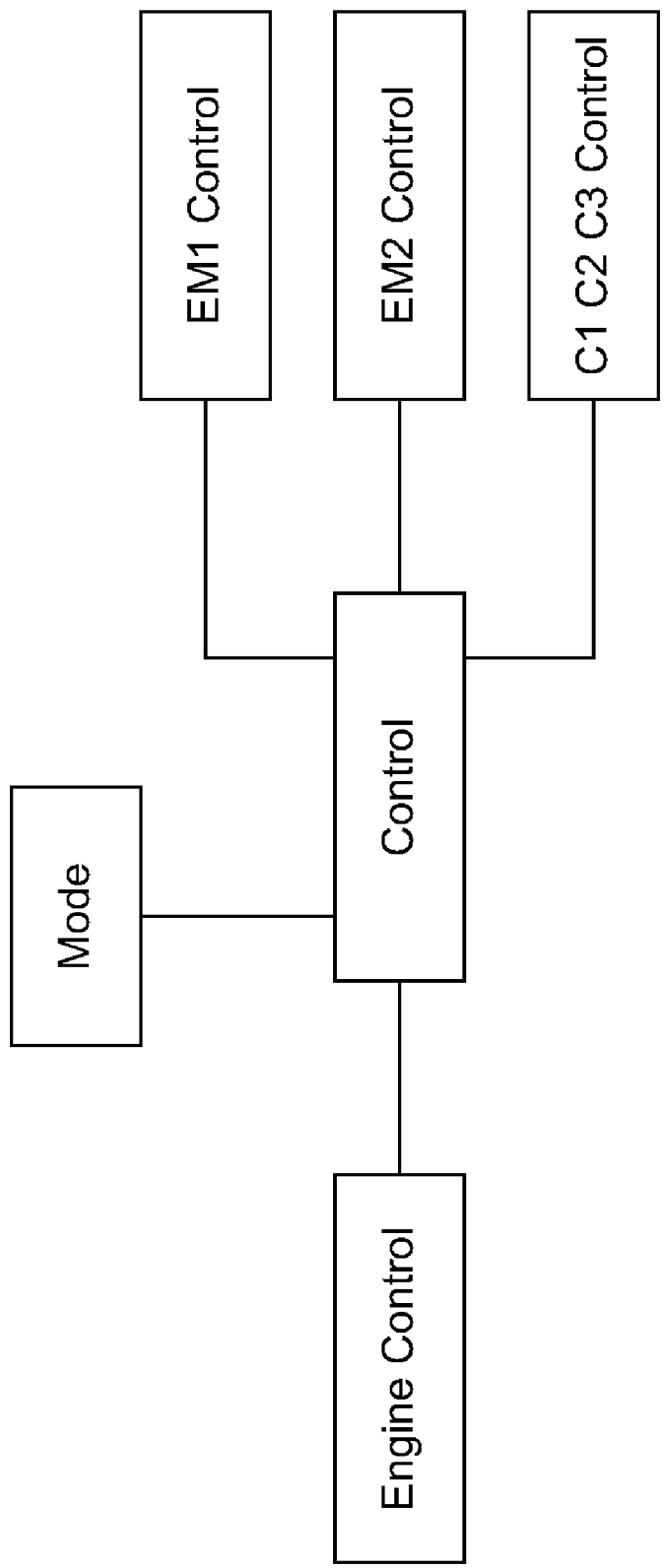
FIG. 3 is a schematic diagram of a control system for the drive train shown in FIG. 1 according to an exemplary embodiment.

According to an exemplary embodiment, an operator (e.g., driver) of vehicle V1 may manually switch the transmission T1 from low speed mode to high speed mode or vice-versa. According to another exemplary embodiment, the transmission T1 is automatically switched from low speed mode to high speed mode (and vice-versa) by a control system (see, e.g., FIG. 3). The control system may include various operator inputs (such as, e.g., desired vehicle speed, torque, traction, terrain, etc.) and also various system inputs (such as, e.g., current vehicle speed, engine speed, power, and torque, electromagnetic device speed, power, and torque, etc.). As shown in FIG. 3, according to one exemplary embodiment, the control system is configured to monitor and/or control the engine, the mode of the transmission, the first electromagnetic device EM1, the second electromagnetic device EM2, the clutch C1, the clutch C2, and/or the clutch C3.

According to an exemplary embodiment, gears within the transmission T1 are sized according to the specific application and desired performance characteristics of the vehicle V1. According to one exemplary embodiment, the gears within the transmission T1 have tooth counts as shown in Table 1. However, according to other exemplary embodiments, the tooth counts of the gears may vary more or less than that shown. According to other exemplary embodiments, the engine E1, the electromagnetic devices EM1 and EM2, the clutches C1-C4, and the shafts S1-S8 may all vary according to the specific application and desired performance characteristics of the vehicle V1.

TABLE 1

| Gear # | Tooth Count |
| --- | --- |
| Gear 1 | 81 |
| Gear 2 | 24 |
| Gear 3 | 33 |
| Gear 4 | 77 |
| Gear 5 | 77 |
| Gear 6 | 49 |
| Gear 7 | 50 |
| Gear 8 | 55 |
| Gear 9 | 74 |
| Gear 10 | 64 |
| Gear 11 | 19 |
| Gear 12 | 26 |
| Gear 13 | 28 |
| Gear 14 | 47 |
| Gear 15 | 82 |

It should be noted that references to "front," "rear," "top," and "base" in this description are merely used to identify various elements as are oriented in the FIGS., with "front" and "rear" being relative to the environment in which the device is provided.

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is important to note that the construction and arrangement of the electromechanical variable transmission as shown in the various exemplary embodiments is illustrative only. Although only a few embodiments have been described in detail in this disclosure, those skilled in the art who review this disclosure will readily appreciate that many modifications are possible (for example, variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present embodiments.

What is claimed is:

1. A vehicle drive comprising:
a first gear set including a sun gear, a ring gear and planetary gears which couple the sun gear to the ring gear;
a second gear set including a sun gear, a ring gear and planetary gears which couple the sun gear to the ring gear, wherein the planetary gears of both sets are rotatably supported by respective planetary gear carriers which are coupled to each other;
an engine;
a first clutch which selectively engages the engine to the ring gear of the first gear set;
a first motor/generator coupled to the sun gear of the first gear set;
a second motor/generator coupled to the sun gear of the second gear set and electrically coupled to the first motor/generator;
a second clutch which selectively engages the engine to the second motor/generator; and
a third clutch and a third gear set which operate to selectively engage the ring gear of the second gear set to the planetary gear carriers of the first and second gear sets.

2. The drive of claim 1, further comprising a fourth gear set including at least two gears which couple the first clutch to the ring gear of the first gear set.

3. The drive of claim 1, further comprising a fifth gear set including at least two gears which couple the second clutch to the second motor/generator.

4. The device of claim 1, wherein the third gear set includes a first pair of gears which couple the ring gear of the second gear set to the third clutch.

5. The drive of claim 1, further comprising a brake mechanism for preventing rotation of the first motor/generator.

6. The drive of claim 1, further comprising a planetary gear set having at least a ring gear, wherein the planetary gear carriers of the first and second gear sets are coupled to the ring gear of the planetary gear set.

7. A vehicle transmission, comprising:
a first planetary gear set having planetary gears;

a second planetary gear set having planetary gears directly coupled to the planetary gears of the first planetary gear set;

a third planetary gear set coupled to both the first and second planetary gear sets, wherein the third planetary gear set is radially offset from the first and second planetary gear sets;

an engine selectively rotationally engaged to the first planetary gear set;

a first electromagnetic device rotationally coupled to the first planetary gear set; and a second electromagnetic device rotationally coupled to the second planetary gear set and selectively rotationally engaged with the engine.

8. The transmission of claim 7, wherein the first electromagnetic device and the second electromagnetic device are electrically connected to one another to permit the transfer of electrical power between the electromagnetic devices.

9. The transmission of claim 7, wherein the second planetary gear set also includes a ring gear coupled to the planetary gears of the first planetary gear set.

10. The transmission of claim 9, wherein the first planetary gear set is coupled to at least one of a front axle and a rear axle of a vehicle.

11. The transmission of claim 10, wherein the second planetary gear set is selectively rotationally engaged with at least one of the front axle and the rear axle of the vehicle.

12. The transmission of claim 11, wherein when the second planetary gear set is selectively rotationally engaged with at least one of the front axle and the rear axle of the vehicle, the second electromagnetic device is disengaged from the engine.

* * * * *